(12) United States Patent
Nagata et al.

(10) Patent No.: US 7,333,649 B2
(45) Date of Patent: Feb. 19, 2008

(54) MEASUREMENT PROCESSING APPARATUS FOR GEOMETRICALLY MEASURING AN IMAGE

(75) Inventors: Takefumi Nagata, Kaisei-machi (JP); Kazuo Shimura, Kaisei-machi (JP); Takeshi Ohkubo, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 366 days.

(21) Appl. No.: 09/983,749

(22) Filed: Oct. 25, 2001

(65) Prior Publication Data

US 2002/0048394 A1    Apr. 25, 2002

(30) Foreign Application Priority Data

Oct. 25, 2000    (JP)    ............... 2000-324887

(51) Int. Cl.
*G06K 9/00* (2006.01)
*G06K 9/46* (2006.01)
*G06K 9/36* (2006.01)

(52) U.S. Cl. ............... 382/132; 382/201; 382/286; 356/625

(58) Field of Classification Search ............... 382/132, 382/106, 128, 286; 128/920, 922–925
See application file for complete search history.

(56) References Cited

U.S. PATENT DOCUMENTS

| | | | |
|---|---|---|---|
| 4,258,264 A | 3/1981 | Kotera et al. | |
| 4,276,473 A | 6/1981 | Kato et al. | |
| 4,315,318 A | 2/1982 | Kato et al. | |
| 4,387,428 A | 6/1983 | Ishida et al. | |
| 5,272,760 A * | 12/1993 | Echerer et al. | 382/132 |
| 5,275,760 A * | 1/1994 | Johnson | 252/389.61 |
| 5,461,399 A * | 10/1995 | Cragun | 715/729 |
| 5,483,960 A * | 1/1996 | Steiger et al. | 600/425 |
| 5,740,267 A * | 4/1998 | Echerer et al. | 382/132 |
| 7,054,476 B2 * | 5/2006 | Oosawa et al. | 382/132 |

FOREIGN PATENT DOCUMENTS

JP    55-12429    1/1980

(Continued)

OTHER PUBLICATIONS

"A Guide to X-ray Image Measurement in Orthopedic Surgery" 1990.

*Primary Examiner*—Bhavesh M Mehta
*Assistant Examiner*—Charles Kim
(74) *Attorney, Agent, or Firm*—Sughrue Mion, PLLC.

(57) ABSTRACT

An measurement processing apparatus for efficiently measuring geometric data of an image is provided. A reference-image outputting means forms a reference-image based on an image that has been previously measured as well as a setting order data which indicates a suggestion as to the order in which the measuring points should be set and which shows the same setting order in which the measuring points were set for a previously performed measurement of a past-measurement image, and outputs the reference-image and the setting order data to an image display means. While consulting the reference-image and the setting order data displayed on the image display means, an operator can set, by use of a measuring point setting means, the measuring points at the correct positions and in the correct order in the subject image displayed on a display screen, and the geometrical data can be measured automatically and efficiently.

15 Claims, 5 Drawing Sheets

FOREIGN PATENT DOCUMENTS

| | | |
|---|---|---|
| JP | 55-116340 | 9/1980 |
| JP | 55-163472 | 12/1980 |
| JP | 56-11395 | 2/1981 |
| JP | 56-104645 | 8/1981 |
| JP | 4-221537 A | 8/1992 |
| JP | 9-056706 A | 3/1997 |

* cited by examiner

CURVATURE MEASUREMENT BY COBB METHOD

A' → b'
A" → b"

B' → b'
B" → b"

MEASUREMENT PROCESSING APPARATUS FOR GEOMETRICALLY MEASURING AN IMAGE

BACKGROUND OF THE INVENTION

1. Field of the Invention

The present invention relates in general to a measurement processing apparatus for geometrically measuring an image, and in particular to a measurement processing apparatus for automatically measuring the geometrical data such as the distance between measuring points, the angle formed between two lines connecting measuring points, etc., corresponding to the positional data and the measurement objective of the measuring points set for a medical image or the like displayed on a CRT monitor or the like.

2. Description of the Related Art

Recent years have seen the practical application of CR (Computed Radiography) systems for obtaining radiation images spanning an extremely wide range of radiation exposures, which are used in performing diagnosis at hospitals and other medical facilities. These CR systems utilize stimulable phosphor sheets which store a portion of the radiation energy passing therethrough upon the irradiation thereof with X-rays or other forms of radiation; after which, the stimulable phosphor sheet is irradiated with a visible, infrared, or other excitation light causing a stimulated emission corresponding to the radiation energy stored thereon to be emitted. According to these CR systems, a stimulable phosphor sheet on which the radiation-image data of a target subject, such as a human body, has been stored is scanned with an excitation light and a stimulated emission is caused to be emitted thereby, said stimulated emission is photoelectrically read out by a photomultiplier and obtained as an image signal, and a radiation image corresponding to the obtained image signal is output to film (a photosensitive material), or the display screen of a CRT monitor or the like as a visible-image (refer to, for example, Japanese Unexamined Patent Publication Nos. 55(1980)-12429, 56(1981)-11395, 55(1980)-163472, 56(1981)-104645, 55(1980)-116340, granted to the inventors of the present invention).

Incidentally, in orthopedic surgery and the like, among medical fields, the negative film from which a radiation image was output is employed not only for observation and photographing. For example, as described in the book "A Guide to X-ray Image Measurement in Orthopedic Surgery" by Kazuo Hiroshima and Sakuo Komenobe, Kanehara Press, radiation images are also used for the purpose of measuring geometrical data as in the case of scoliotic curvature (using the Cobb method, the Ferguson method or the like), the Kyphotic index, the ulnar deviation, the radial rotation, etc., wherein an operator actually marks by use of a red pencil or the like the measuring points on a radiation image that has been output to film, and manually measures, using a measuring instrument such as a ruler, a protractor and the like, the distance between the marked measuring points, the angle formed between two straight lines (intersecting lines) connecting measuring points, etc.; based on the measured distance, etc., aforementioned curvature, etc. is computationally obtained, the ratio of the distance between the measuring points is obtained, the area of a desired polygonal region is obtained, etc., and a geometrical measurement (analysis) of the radiation image is performed.

On the other hand, because a radiation image obtained by a CR system is represented by a digital image signal as described above, it becomes possible to automatically obtain the curvature, etc., by displaying the radiation image on the display screen of a CRT monitor or other image display apparatus and then specifying measuring points on this displayed screen, and prerecording the measurement objectives (aforementioned curvature, etc.) and measurement method (aforementioned curvature computation method, etc.), the process of measuring the geometrical data of a radiation image can be automated, whereby the burden of measuring on a measurer, such as a doctor, a radiation technician and the like, can be reduced appreciably.

However, even though it can be said that automatic measuring of the geometrical data of a radiation image becomes possible, the setting of the measuring points on the display screen still depends on a manual input by the operator.

On the other hand, there is a plurality of possible measurement objectives, such as the curvature, the Kyphotic index, the ulnar deviation, etc. described above, and because the positions of the measuring points that must be set for each measurement objective differ, in actuality, it is practicably impossible to memorize the positions that the measuring points should be set at for each of the entirety of measurement objectives.

Further, for cases in which an algorithm for automatically measuring the distance or angle is prerecorded and the curvature or the like is to be automatically derived, although the measuring points must be set according to a predetermined setting order, in actuality, it is practicably impossible to memorize the setting order for each of the entirety of measurement objectives.

Accordingly, when the geometrical data of an image is to be measured, it is necessary to set the measuring points while consulting a manual containing the measurement method, the setting order of the measuring points, etc., and there is a problem in that the efficiency of the measurement and the diagnosis is not always good.

SUMMARY OF THE INVENTION

The present invention has been developed based on consideration of the circumstances described above, and it is a primary object of the present invention to provide a measurement processing apparatus that can efficiently measure the geometrical data of an image displayed on the display screen of an image display apparatus without requiring that the operator has memorized the positions of the measuring points that should be set corresponding to a measurement objective, or the setting order thereof.

The measurement processing apparatus for geometrically measuring an image according to the present invention comprises: an image display means; a measuring point setting means for setting the measurements points used for geometrically measuring an image that is the subject of a measurement operation (hereinafter referred to as a subject image) and which is displayed on the display screen of the image display means; and a geometrical-data measuring means for geometrically measuring, based on the positions of the measuring points that have been set, the subject image which is displayed on the display screen of the image display means; further comprising a reference-image outputting means for outputting a reference-image in order that a suggestion as to the positions at which the measuring points should be set is indicated.

As to the reference-image, in which a suggestion as to the positions at which the measuring points should be set is indicated, any image from which an understanding as to at what positions the measuring points should be set for taking a measurement, corresponding to the measurement objective, of the geometrical data of a subject image which is displayed on the display screen of the image display means, can be employed thereas. For example, an actual image showing a bone tissue substantially the same as that shown in the subject image, a model illustration of the bone tissue, etc., can be employed.

A mouse or other pointing device can be used as the measuring point specifying means.

Note that the measuring points such as the center point, the lines, etc. for geometrically measuring a subject image, have been generally termed as points set therefor on the image displayed on the image display means; therefore, the meaning of the expression "setting the measuring points" is not only the setting of "points" on the display screen of the image display means. For example, the displaying of a straight line on the display screen and the moving or rotating of the displayed straight line by the use of a mouse or the like to set a measurement angle, or the setting of a rectangular POI (Region of Interest) or the radius of a circle by the use of a mouse, etc. are included in the referents of the expression "setting the measuring points".

The geometrical-data measuring means can be a means of a configuration for prerecording an algorithm (a measuring program) for geometrically measuring, corresponding to the measurement objective, the distance between measuring points, the angle formed between two lines connecting measuring points, etc. geometrical data of an image automatically, and automatically deriving the curvature, etc.

The reference-image outputting means can be any means that outputs a reference-image: for example, a printer or the like for outputting a hard-copy of the reference-image; or a CRT, LCD or other display means for outputting a soft copy of the reference-image are suitable.

In the case of the latter, the CRT, LCD, or other image display means displaying the reference-image can be a combined-use means for also outputting and displaying the subject image along side the reference-image, and it is desirable that this combined-use image display means displays the reference-image concurrently along side the image that is the subject of the measurement operation, or switches between displaying the reference-image and the subject image.

Further, according to the measurement processing apparatus of the present invention, it is desirable that the reference-image outputting means is a means for forming and outputting a reference-image based on an image of which a measurement has been taken previously. That is to say, the reference-image is an image formed based on an image of which a measurement has been taken in the past for the same measurement objective as for the image of which a measurement is to be taken.

Still further, according to the measurement processing apparatus of the present invention, it is desirable that the reference-image outputting means is a means for outputting data suggestive of the setting order in which the measuring points are to be set.

It is desirable that this data suggestive of said setting order is output and displayed as visible data on the display screen of the image display means along with the reference-image.

Further, according to the measurement processing apparatus of the present invention, it is desirable that the reference-image outputting means is a means for forming and outputting data suggestive of the setting order of the measuring points to be set for the subject image, based on the setting order in which the measuring points were set when a previous measurement operation was performed.

The expression "based on the setting order in which the measuring points were set when a previous measurement operation was performed" means that the measuring points of the subject image are to be set in the same setting order as the measuring points were set when a previous measurement was performed.

According to the measurement processing apparatus of the present invention, because a reference-image outputting means for outputting a reference-image in which a suggestion is indicated as to at which positions the measuring points should be set is provided, even if the positions at which the measuring points that should be set corresponding to a measurement objective have not been memorized by an operator, the measuring points for a subject image can be set at the appropriate positions while viewing an outputted reference-image, and the geometrical measuring of the subject image can be performed efficiently.

In addition, if the reference-image outputting means is also a means for outputting data suggestive of the setting order (hereinafter referred to as setting order data) in which the measuring points are to be set, the measuring points can be set at the correct points and in the correct setting order, whereby the efficacy in performing the geometrical measurement of a subject image can be improved a level.

Further, if a configuration is adopted wherein a reference-image is formed based on an image that was the subject image of a measurement taken in the past for the same measurement objective, or a setting order data for the measuring points of the present subject image is formed so that the setting order thereof is the same as the setting order of the measuring points that were set when said past measurement was performed, each diagnostic facility or individual diagnostician can easily form reference-images and setting order data conforming to the respective conditions.

DESCRIPTION OF THE PREFERRED EMBODIMENTS

Hereinafter, the preferred embodiment of the present invention will be explained with reference to the attached drawings.

Figure 1:
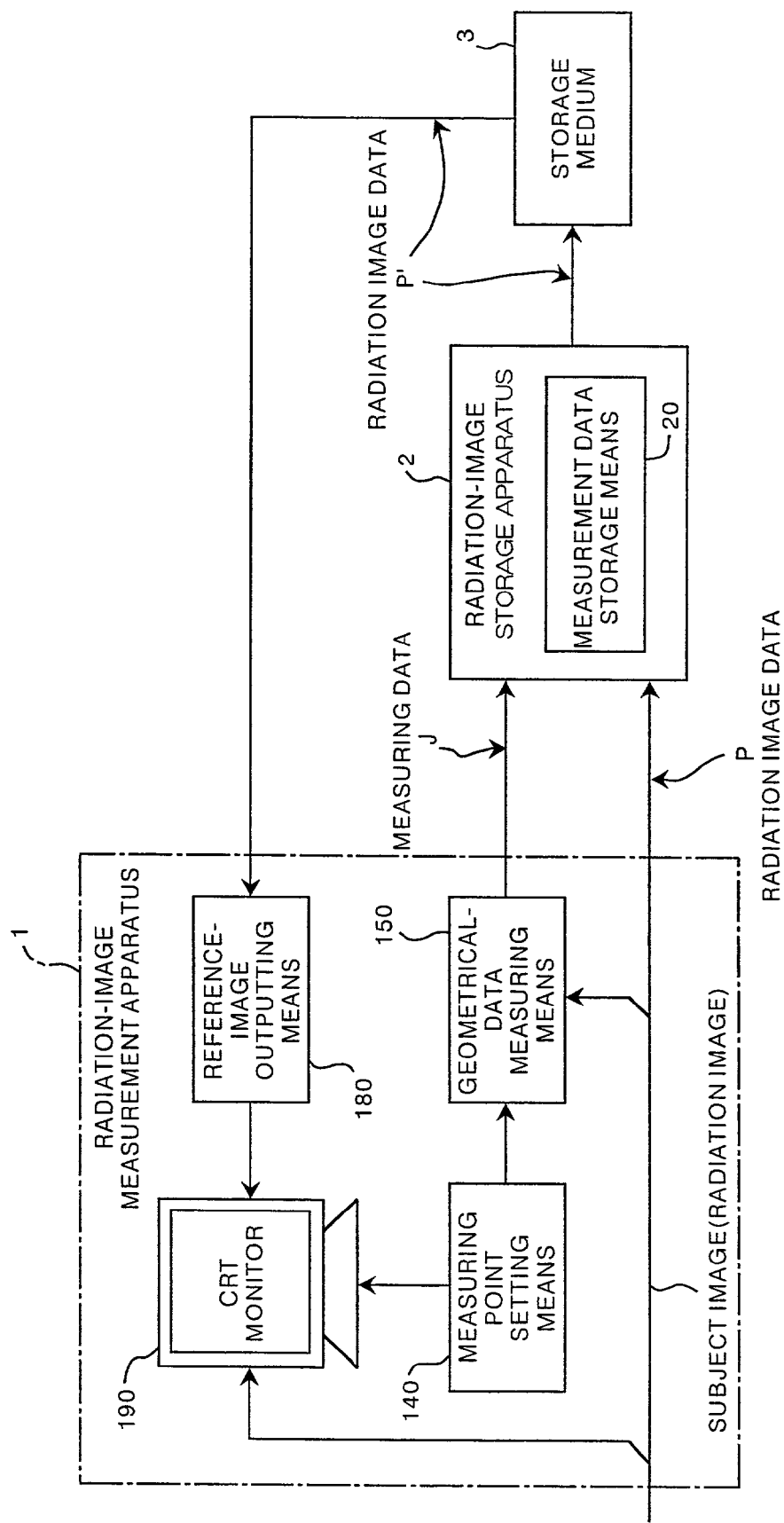
FIG. 1 is a block drawing of an image measurement system including a radiation-image measurement apparatus that is the first embodiment of the measurement processing apparatus according to the present invention.
Figure 2:
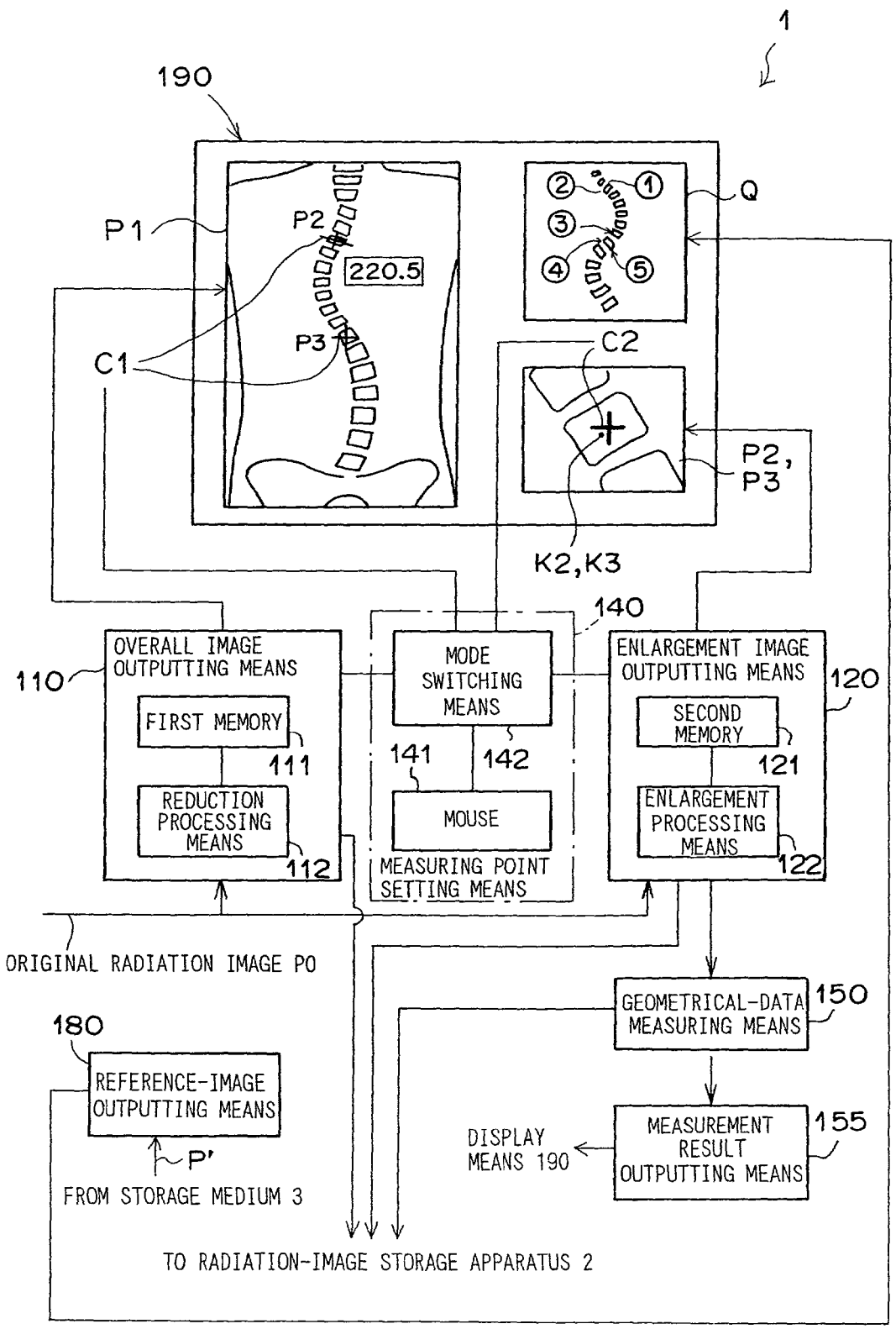
FIG. 2 is a detailed block drawing of the radiation-image measurement apparatus.

FIG. 1 is a block drawing of an image measurement system including a radiation-image measurement apparatus that is the first embodiment of the measurement processing apparatus according to the present invention, and FIG. 2 is a detailed block drawing of the radiation-image measurement apparatus.

As shown in FIG. 1, this image measurement system comprises a radiation-image measurement apparatus 1 for geometrically measuring a radiation image input thereto as a subject image, and a radiation image storage apparatus 2 for correlating the measurement data inputted from the radiation-image measurement apparatus 1 to a radiation image that has previously been measured (hereinafter also referred to as a past-measurement image) and stored on a predetermined storage medium 3.

The radiation image storage apparatus 2 is that which was proposed in japanese Patent Application No. 11(1999)-321463 filed by the inventors of the present invention, and comprises a measurement data storage means 20 into which are input a radiation-image data P1 representing a past-measurement image, which includes measuring points that are the objects of measurement, and a measurement data J formed of the measurement result obtained from a measurement taken based on the positional data of the measuring points set (specified) at the radiation-image measurement apparatus 1 and the measuring points, and which correlates the inputted radiation-image data P1 and the measurement data J to form a radiation-image data P', and saves the radiation-image data P' in a predetermined storage medium 3. The radiation-image data P' can consist of, for example, the radiation image data P1 to which the measurement data J has been attached as supplementary data, or the image represented by said radiation-image data P1 to which the measurement positions have been correlated and into which the measurement data J has been embedded.

Note that, as to the measurement data storage means 20, aside from storing the radiation-image data P', in which the measurement data J and the radiation-image data P1 have been correlated, in a single storage medium 3, after correlating the measurement data J and the radiation-image data P1, the measurement data storage means 20 can store the radiation-image data P1 in a first storage medium, on the one hand, and the measurement data J in a second storage medium different from the first storage medium, on the other hand.

The radiation-image measurement apparatus 1 according to the current embodiment, as shown in FIG. 1, comprises: an image display means 190, such as a CRT monitor or the like, for displaying an outputted image; a measuring-point setting means 140 for setting on the subject image displayed on the display screen of the image display means 190 the measurements points for taking a geometrical measurement thereof; a geometrical measuring means 150 (hereinafter also referred to as a measuring means) for automatically and geometrically measuring, based on the positional data of the measuring points that have been set on the display screen and the setting order data, the subject image; and a reference-image outputting means 180 for forming a reference-image suggestive of the positions at which the measuring points should be set and displaying the formed reference-image on the display screen of the image display means 190 concurrently along side the subject image, or switching between the displaying of the reference-image and the subject image.

A mouse or other pointing device is used as the measuring point setting means.

The measuring means 150 is of a configuration wherein a program for automatically measuring the geometrical data, such as the distance between measuring points, the angle formed by intersecting lines, etc., corresponding to the measurement objective, such as the degree of scoliotic curvature, the Kyphotic index, the ulnar deviation, the radial rotation, etc., and automatically deriving the degree of curvature, etc., is recorded in the ROM thereof.

As to the reference-image, any image from which an understanding as to at what positions the measuring points that should be set for performing a measurement, corresponding to the measurement objective, of the geometrical data of a subject image which is displayed on the display screen of the image display means can be employed thereas. For example, an actual image showing a bone tissue substantially the same as that shown in the subject image, a model illustration of the bone tissue, etc. can be employed.

According to the current embodiment, the reference-image outputting means 180 employs a past-measurement image, which has been the subject image of a previous measurement (the image represented by the radiation-image data P' stored on the storage medium 3), as the reference-image. Of course, a model illustration of the bone tissue, etc., based on this past-measurement image can be formed and employed as the reference-image.

Further, the reference-image outputting means 180 forms the setting order data, which is visible data suggestive of the setting order for the setting of the measuring points, to be the same as the setting order of the measuring points that were set for the previously performed measurement of the past-measurement image; the formed setting order data is output and displayed on the image display means 190 along with the reference-image.

Next, a detailed explanation of the radiation-image measurement apparatus 1 will be provided with reference to FIG. 2.

The radiation image measuring apparatus 1 shown in FIG. 2 comprises: an overall image outputting means 110 into which an original radiation-image PO that has been obtained of a human spinal column and that includes measuring points that are predetermined measurement objects is inputted as a subject image. The overall image outputting means reduces the inputted original radiation-image PO to obtain the entire-image P1 of the original radiation-image PO and displays said entire-image P1 on the left half area of the display screen of the image display means 190. Also, the radiation-image measuring apparatus 1 includes a first cross cursor C1, an enlargement image outputting means 120, and a second cross cursor C2. In the displayed entire-image P1, the first cursor C1 is used for indicating a portion of the displayed entire-image P1. The original radiation-image PO is also inputted to the enlargement image outputting means 120. The enlargement image outputting means 120 enlarges the inputted original radiation-image PO, and displays an image P2 and an image P3 on the right half of the display screen of the image display means 190. In the enlarged radiation image, each of the images P2 and P3, which have been enlarged and displayed in accordance with the ratio of the enlargement ratio obtained by the enlargement image outputting means 120 to the reduction ratio obtained by the overall image outputting means 110 (enlargement ratio/reduction ratio), correspond to a portion formed of a point indicated by the first cross cursor C1 within the entire-image P1 (indicated points) and the area adjacent thereto (hereinafter referred to simply as enlarged-portion images P2 and P3). In the enlarged-portion images P2 and P3, the second cursor C2 is for specifying K1, K2, etc., which are reference points for measurement (measuring points) within each of the displayed enlarged-portion images P2 and P3. The radiation-image measurement apparatus 1 further comprises a measuring means 150, a measurement-result outputting means 155, a mode switching means 142, a mouse 141, and a reference-image outputting means 180. The measuring means 150 computes a result of measurement (e.g., the distance between the measuring points K1 and K2) in accordance with a prerecorded, predetermined measurement algorithm, based on the positions of the specified measuring points K1, K2, etc. The measurement-result outputting means 155 overlays and displays the obtained measurement result on the entire-image P1 displayed on the display screen of the image display means 190. The mode switching means 142 switches between an indicating mode M1 and a specifying mode M2. In the indicating mode M1, the second cross cursors C2 in the displayed enlarged-portion images P2 and P3, move in synchronism with the movement of the first cross cursor C1 in the entire-image P1; in the specifying mode M2, the first cross cursor C1 in the entire-image P1 moves in synchronism with the second cross cursors C2 in the enlarged-portion images P2 and P3. The mouse 141 serves as an interface for arbitrarily moving the cross cursors C1 and, within the respective areas of the display screen, in accordance with each of the above-described modes. The reference-image outputting means 180 forms a reference-image Q, based on a past-measurement image that is a radiation image of which a measurement has previously been taken, and a setting order data suggestive of the setting order in which the measuring points are to be set when a measurement of the subject image is to be taken and which represents the same setting order in which the measuring points were set in the past-measurement image, and outputs and displays this formed setting order data together with the reference-image Q to the image display means 190.

As shown in the drawing, the measuring-point setting means 140 comprises the mouse 141 and the mode switching means 142.

Figure 3:
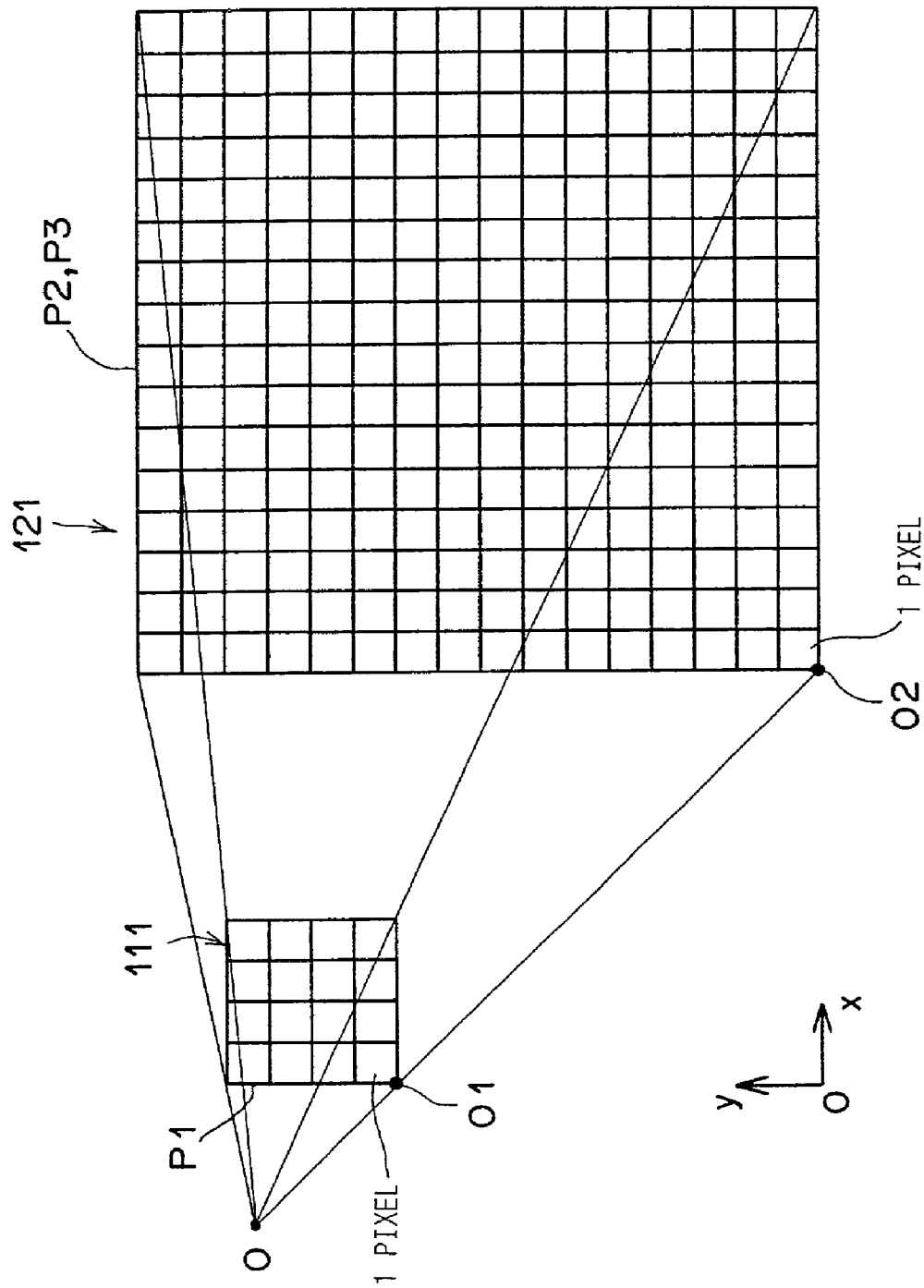
FIG. 3 shows the relation between the positions of the memory 1 and the memory 2.

The overall image outputting means 110 comprises a reduction processing means 112 for reducing an original radiation-image PO inputted as a subject image to obtain an entire-image P1, and a first memory 111 for storing the entire-image P1. On the other hand, the enlargement image outputting means 120 comprises an enlargement processing means 122 for enlarging an inputted original radiation-image to obtain an enlarged radiation image, and a second memory 121 for storing the enlarged radiation image. Further, as shown in FIG. 3, the positional relation between the image stored in the first memory 111 and the image stored in the second memory 121 has previously been determined corresponding to the value of the above-described ratio ((enlargement ratio)/(reduction ratio), e.g.; 4) with origins 01, 02, etc. as reference. That is to say, a four-pixel portion of the image stored in the second memory 121 is equivalent in size to a one-pixel portion of the image stored in the first memory 111, and when the first cross cursor C1 is moved by 1 pixel within the entire-image P1 displayed on the display screen of the image display means 190, the displayed enlarged-portion images P2 and P3 are scrolled by 4 pixels.

Next, the operation of this radiation image measuring apparatus 1 will be explained.

First, the original radiation-image PO is inputted to the both the overall image outputting means 110 and the enlargement image outputting means 120. The original radiation-image PO inputted to the overall image outputting means 110 is reduced by the reduction processing means 112 and stored in the first memory 111. The reduced original radiation-image PO is displayed as an entire-image P1 on the left side of the display screen of the image display means 190. On the other hand, the original radiation-image PO inputted to the enlargement image outputting means is enlarged by the enlargement processing means 122 and stored in the second memory 121.

In the storage medium 3, the measurement data obtained from a previous measurement that was performed for the same measurement objective as the present measurement objective is correlated to the measurement positions that occurred in the past-measurement image that was the subject when said previous measurement was performed, and recorded and stored as a radiation-image data P'.

The reference-image outputting means 180 reads out from the storage medium 3 a radiation-image data P' relating to the past-measurement image corresponding to the present measurement objective, and based on this radiation-image data P', forms a reference-image Q suggestive of the measuring points corresponding to the present measurement objective.

Further, the reference-image outputting means 180 forms a setting order data to set the setting order of the measuring points for the present measurement objective to be the same setting order as the measuring points that were set in the past-measurement image.

Then, this formed setting order is output along with the reference-image Q to the image display means 190 and displayed on the upper right ¼ area of the display screen thereof.

Figure 4:
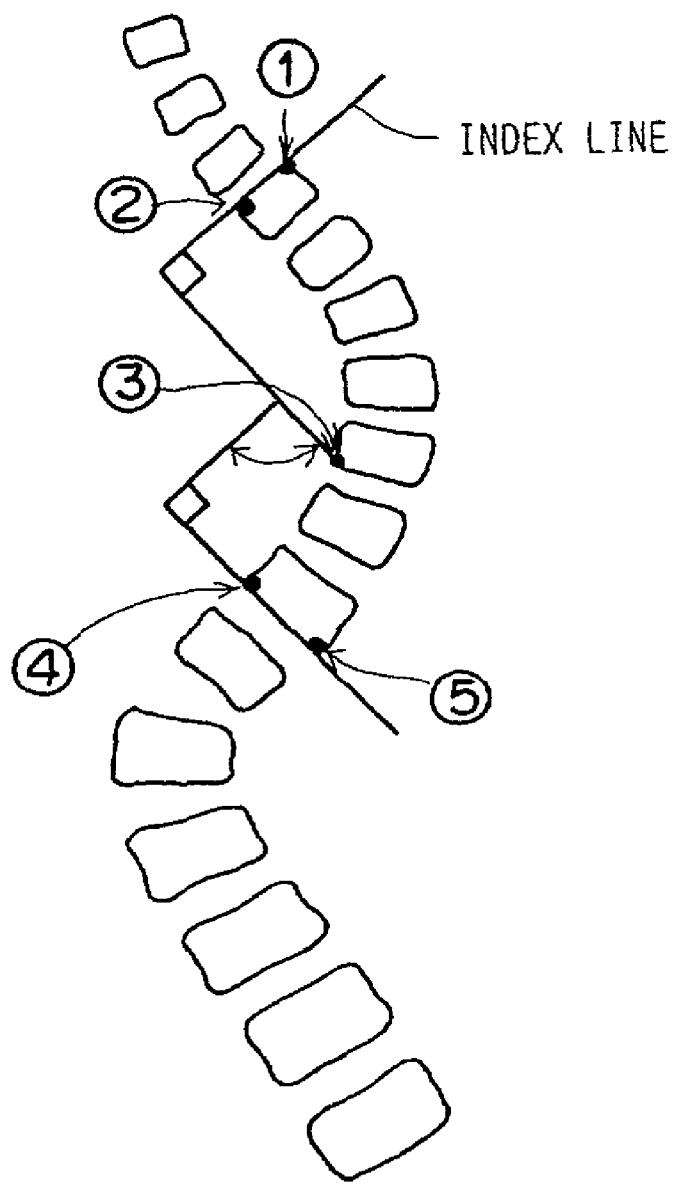
FIG. 4 shows an example of an outputted reference-image and setting order data.

The state in which the setting order data is outputted and displayed on the image display means 190 as visible data, as shown in FIG. 4, for example, can be such that the whole setting order of the reference-image is displayed together as numerical values enclosed in circles. Alternatively, only the measurement positions that should be set henceforth can be indicated by a close-up display method, wherein the display color thereof is changed or said positions are indicated by an arrow, etc. Further, predetermined index lines corresponding to the measuring points and the measurement objective can be displayed on the reference-image.

Next, while consulting the reference-image Q and the setting order data displayed on the display screen of the image display means 190, the operator manipulates the mouse 141 and sets the candidate position of the measuring point K1 (the position that should be set as a measuring point), which is indicated by the first cross cursor C1 on the entire-image P1.

As shown in FIG. 2, although the specific dimensions of the scoliotic curvature shown in the reference-image Q and the specific dimensions of scoliotic curvature shown in the subject image differ, when the curvature is to be measured by use of the Cobb method, for example, the question as to at what positions and in what order the measuring points should be set can be answered by consulting the measuring points corresponding to the measurement of the curvature as shown in the reference-image and the setting order data.

That is to say, because the measurement taken according to the Cobb method consists of obtaining the angle formed at the intersection of the line extending from the line extending from the upper edge of the last vertebrae in the upper position (the vertebrae slanting the most) and the line extending from the lower edge of the last vertebrae in the lower position, based on the reference-image and the setting order data shown in FIG. 4, it is understood that the measuring points should be set in the subject image according to the numerical order of the numbered circles 1-4 shown in the reference-image, and in the positions corresponding thereto.

At this time, the mode switching means 142 is switched to the indicating mode M1 at the start, in which the second cursor C2 moves in synchronism with the first cursor C1 occurring in the entire-image P1, and the enlargement image outputting means 120 derives the point on the enlarged radiation image stored in the second memory 121 corresponding to the candidate position of the first measuring point K1 indicated by the first cross cursor C1 in the entire-image P1; the region centered on this derived point is displayed on the right ¼ area of the display screen of the image display means 190 as an enlarged-portion image P2 that has been enlarged 4 times the size thereof occurring in the entire image P1. Further, the second cursor C2 is fixedly displayed at the center of the enlarged-portion image P2.

The operator manipulates the mouse 141 to move the first cross cursor C1 in the entire-image P1, and the displayed enlarged-portion image P2 scrolls a movement amount 4 times the movement amount that the cross cursor C1 has been moved. If the operator manipulates the mouse 141 to indicate with the first cross cursor C1 the region near the measuring point K1 in the entire-image P1, the enlarged-portion image P2 including the measuring point K1 is displayed within the enlarged-portion image display area in the lower right ¼ area of the display screen of the image display means 190. Here, the operator manipulates the mouse 141 to switch the cursor to the measuring point specifying mode M2 at the mode switching means, whereby the fixation of the second cross cursor C2 within the displayed enlarged-portion image P2 is released, and the operator manipulates the mouse 141 move the second cross cursor C2 so as to align the second cross cursor C2 on the measuring point K1 in the displayed enlarged-portion image P2. At this point, the first cross cursor C1 is moved slightly within the entire-image P1, in synchronism with the movement of the second cross cursor C2 within the enlarged-portion image P2.

Because the enlarged-portion image P2 is displayed at a resolution four times that of the entire-image P1, the operator can align the second cursor C2 with the measuring point K1 in the displayed enlarged-portion image P2 with a high degree of accuracy; after the position of the second cursor C2 has been matched to the position of the measuring point K1, the setting of the measuring point is finalized by manipulating the mouse to make an input indicative thereof to the enlargement image outputting means 120.

Upon reception at the enlargement image outputting means 120 of an input indicative that the setting of the measuring point is finalized, the position of the second cross cursor C2 in the displayed enlarged-portion image P2 is outputted to the measuring means 150, and the display of the enlarged-portion image P2 is fixed.

Continuing, in order to set another measuring point, the operator manipulates the mouse 141 in the same manner as described above, and sets all of the measuring points required for the measurement objective and finalizes the settings thereof. When setting these other measuring points, the enlarged-portion image displayed on the lower right ¼ area of the display screen of the image display means 190 is switched to an image according to said other, set measuring points.

Note that when the operator manipulates the mouse to set the measuring points, a symbol, such as "P2" or "P3", representative of the enlarged-portion image displayed in the lower right ¼ area of the display screen of the image display means 190 and which corresponds to the displayed measuring points is displayed in the region surrounding the each respective point specified in the entire-image P1 by the first cross cursor C1. In this way, the outline of the measurement position occurring in the entire-image P1 is clearly shown.

The measuring means 150 into which the measuring points required for a measurement objective have been input in the manner described above obtains the geometrical data such as the distance between measuring points, etc., based on the positional data of each inputted measuring point in the displayed enlarged-portion images P2 and P3, according to a prerecorded algorithm, and inputs the obtained result to the measurement-result outputting means 155.

The measurement-result outputting means 155 displays the measurement result inputted thereto on the display screen of the image display means 190 (in FIG. 2, the numeral "120.5", which is displayed within the entire-image P1, for example).

After the measurement processing has been completed, the entire-image P1 and the displayed enlarged-portion images P2 and P3 displayed on the display screen of the image display means 190 are input to the radiation image storage apparatus 2 as radiation-image data P from the overall image outputting means 110 and the enlargement image outputting means 120, and the positional data of the measuring points K1, K2 occurring in the displayed enlarged-portion image P2 (for example: a mark "●" representing the position of the measuring point K1 and the measuring point K2; symbols "K1" and "K2"; and the measurement result, such as a numeral "120.5") as well as data representative of the setting order of the measuring points is output as measurement data J from the measuring means 150.

The measurement data storage means 20 of the radiation image storage apparatus 2 correlates the measurement data J inputted thereto with the measurement positions occurring in the radiation-image data P to form a radiation-image data P', and stores the radiation-image data P' including the measurement data J in the storage medium 3.

This post-measurement radiation-image data P' is again employed in the next measurement processing to form a reference-image and setting order data.

In this way, according to the radiation image measuring apparatus of the current embodiment, an entire-image P1, from which the positional relation of the measuring point K1, etc., can be easily grasped, and an enlarged-portion image P2, on which the position of the measuring point K1, etc., can be set accurately are displayed on the same display screen of the image display means 190, and by causing a region indicated by the cursor C1 within the entire-image P1 to be displayed as an enlarged-portion image P2, etc., because the measuring point K1, etc. can be accurately set while the precise positional relation thereof is grasped, an accurate measurement based on the accurately set measuring point K1, etc. can be carried out.

In addition, because a configuration has been adopted wherein a reference-image and setting order data corresponding to the measurement objective are displayed on the same display screen of the image display means 190 along with the subject image of the measurement operation, even if the operator has not memorized the positions and order in which the measuring points according to the measurement objective should be set, said measuring points can be set at the correct positions and in the correct setting order on the subject image while consulting the reference-image and the setting order data displayed on the image display means 190, and the geometrical data of the subject image can be automatically measured with a high degree of efficiency.

Further, because the reference-image is formed based on a past-measurement image, which is an image that was the subject image of a previous measurement having the same measurement objective as the measurement object as the present subject image, or a setting order data is formed so that the measuring points to be set for the subject image are set in the same setting order that the measuring points of the past-measurement image were set when a measurement was taken thereof, each diagnostic facility can easily form a reference-image and setting order data conforming to the respective conditions.

A preferred embodiment of the present invention has been described above, but the present invention is by no means limited to the embodiment described above.

For example, according to the explanation provided above, although the reference-image and setting order data have been outputted as soft-copies displayed in the same display screen as the subject image, the reference-image and setting order data are not limited thereto; for example, the reference-image and setting order data can be output as hard-copies by use of a printer or the like.

Further, although the setting order data has been output as visible data, the setting order data is not limited thereto; the setting order data can be output as voice data. For example, a configuration wherein the data suggestive of the setting order is output as a voice message when a measuring point occurring in the reference-image is pointed to, can be adopted. In this case, the means for outputting the voice message is not required to be a means integrated into the image display means outputting the reference-image.

Still further, although an image showing the measuring points occurring in an image of a bone tissue has been employed as a reference-image and the measuring points have been shown correlated to a setting order, the present invention is not limited thereto; by the displaying of the measurement method, a suggestion as to the positions and setting order of the measuring points that should be set can be indicated as a result. For example, for a case in which the measurement of the curvature is performed according to the Cobb method, a message indicating the instruction "obtain the angle formed at the intersection of the line extending from the upper edge of the last vertebrae in the upper position and the line extending from the lower edge of the last vertebrae in the lower position" can be output as text data or voice data.

Further still, although a configuration in which the radiation-image data relating to a past-measurement image corresponding to the present measurement objective is read out, and a reference-image suggestive of the measuring points corresponding to the present measurement object is formed based on said read out radiation-image data, and a setting order data corresponding to the present measurement objective is formed so as to be the same as the setting order of the measuring points that were set on the past-measurement image, the forming of a reference-image and a setting order data is not limited thereto; for example, the reference-image and setting order data can be formed based on a reference text or the like recording the measurement method.

Additionally, although a configuration has been adopted in which the geometrical data is automatically obtained according to a prerecorded algorithm of the measurement process, after the measuring points have been set in predetermined positions and in a predetermined order, the present invention is not limited thereto; for example, a configuration, for example, wherein the measuring points are set in a desired order and then the data that should be obtained (such as the distance between measuring points, the angle formed at the intersection of two lines, etc.) is specified and then the measurement operation is started, can be adopted.

Further, an explanation has been provided wherein a radiation image has been employed as the subject image, however, any image that is an object of which geometrical data is to be measured can be the subject image of the present invention.

Still further, it is desirable that a function enabling for the correction of the displayed position of a point or line (setting position), such as point (measuring point) and point, line (index line) and line, or the maintaining of existing positional relations between the points and the lines, while correcting the display position (setting position) when the measuring points are to be set on the subject image displayed on the display screen.

Figure 5A:
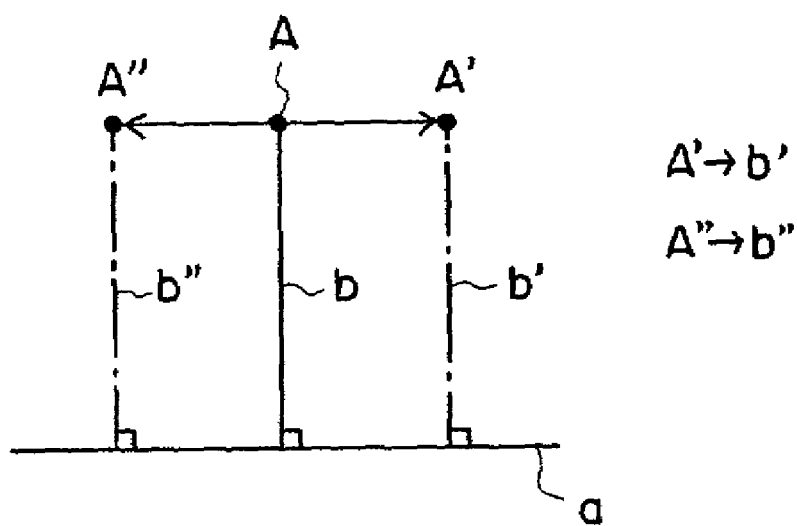
FIGS. 5A and 5B show examples of displays of the positions of the measuring points and index lines that are displayed when said positions are to be corrected.
Figure 5B:
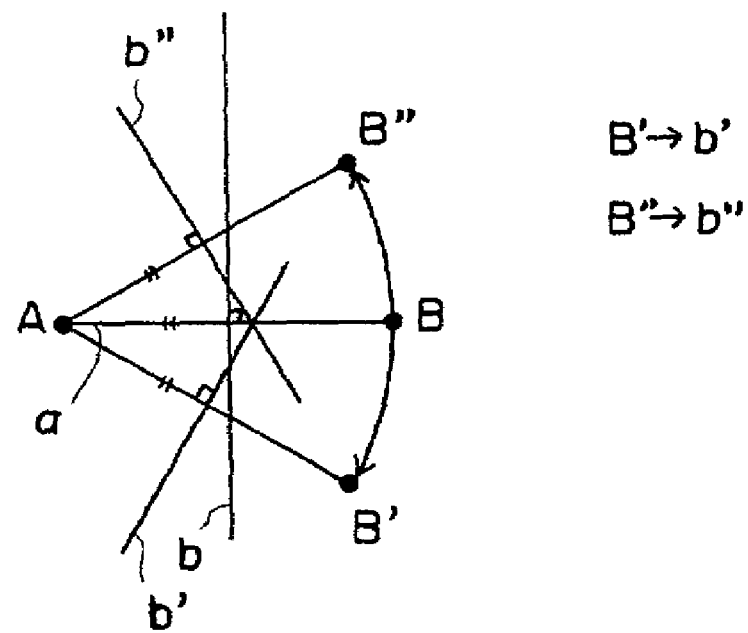

For example, as shown in FIG. 5A, when the first index line a is used as the base line and the perpendicular line b between the first index line a and the measuring point A is used as the second index line, when the measuring point A is moved in laterally within the drawing, the perpendicular line b can be depicted as moving in synchronism with the measuring point A. Further, as shown in FIG. 5B, for a case in which the equally divided line segment b of the perpendicular line 2 between the two points A and B, is used as an index line, when one of the two points, B, is moved as shown in the drawing while maintaining the distance between the two points, the perpendicular equally divided line segment b of the perpendicular line 2 can be depicted as moving in synchronism with the measuring point B. Otherwise, the circumstances relating to the two equally divided line segments of an angle, the equally divided points, etc. are the same.

What is claimed is:

1. A measurement processing apparatus for geometrically measuring an image, comprising
    an image display means,
    a measuring point setting means for setting measuring points for geometrically measuring a subject image which is displayed on the display screen of the image display means,
    a geometrical-data measuring means for geometrically measuring, based on the positional data of the measuring points that have been set, the subject image, further comprising
    a reference-image outputting means for outputting a reference-image that indicates suggestions as to the positions at which the measuring points should be set, and outputs a setting order data suggestive of one of a plurality of measurement objective orders in which the measuring points should be set when a measurement is taken of the subject image,
    wherein the image display means receives input of the reference-image output from the reference-image outputting means, and visibly displays the reference-image.

2. A measurement processing apparatus for geometrically measuring an image as defined in claim 1, wherein
    the reference-image outputting means displays the reference-image alongside the subject image on the display screen of the image display means.

3. A measurement processing apparatus for geometrically measuring an image as defined in claim 2, wherein
    the reference-image outputting means forms and outputs a reference-image based on an image other than the subject image and which has been the subject of a previous measurement.

4. A measurement processing apparatus for geometrically measuring an image as defined in claim 1, wherein
    the reference-image outputting means forms and outputs a reference-image based on an image other than the subject image and which has been the subject of a previous measurement.

5. A measurement processing apparatus for geometrically measuring an image as defined in claim 1, wherein
    the reference-image outputting means forms and outputs said setting order data based on the setting order in which the measuring points were set during a previously performed measurement of an image other than the subject image.

6. A measurement processing apparatus for geometrically measuring an image as defined in claim 1, wherein
the measuring points are set in the same setting order as measuring points set in a previously performed measurement of an image.

7. A measurement processing apparatus for geometrically measuring an image as defined in claim 1, wherein
the suggestions indicated in the reference-image comprise visible data suggestive of the setting positions of the measuring points.

8. A measurement processing apparatus for geometrically measuring an image as defined in claim 7, wherein the reference image comprises an archived image of a previously obtained image.

9. A measurement processing apparatus for geometrically measuring an image as defined in claim 8, wherein the reference image includes appended graphical data supplemental to image data, said graphical data identifying the measuring points on a display of the reference image.

10. A measurement processing apparatus for geometrically measuring an image as defined in claim 1, wherein
the suggestions indicated in the reference-image comprise visible data suggestive of an order of setting the measuring points.

11. A measurement processing apparatus for geometrically measuring an image as defined in claim 1, wherein the reference image includes appended graphical data supplemental to image data, said graphical data identifying the measuring points on a display of the reference image.

12. A measurement processing apparatus for geometrically measuring an image as defined in claim 1, wherein said setting order data is formed so that measuring points are set in a same order of a past-measurement image when a measurement was taken of said past-measurement image.

13. A measurement processing apparatus for geometrically measuring an image as defined in claim 1, wherein said setting order data is set for efficiency of measurement.

14. A measurement processing apparatus for geometrically measuring an image as defined in claim 1, wherein said setting order data is characterized as voice data.

15. A measurement processing apparatus for geometrically measuring an image as defined in claim 1, wherein said visible display of the reference-image comprises a display of the reference image including displaying of the suggested measuring points positions.

* * * * *